United States Patent
Gao et al.

(10) Patent No.: US 9,382,488 B2
(45) Date of Patent: Jul. 5, 2016

(54) GASIFICATION REACTOR

(71) Applicant: SHELL INTERNATIONALE RESEARCH MAATSCHAPPIJ B.V., The Hague (NL)

(72) Inventors: Chengming Gao, Amsterdam (NL); Johannes Cornelis De Jong, Alphen aan den Rijn (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/352,692

(22) PCT Filed: Oct. 17, 2012

(86) PCT No.: PCT/EP2012/070548
§ 371 (c)(1),
(2) Date: Apr. 18, 2014

(87) PCT Pub. No.: WO2013/057133
PCT Pub. Date: Apr. 25, 2013

(65) Prior Publication Data
US 2014/0326925 A1 Nov. 6, 2014

(30) Foreign Application Priority Data
Oct. 21, 2011 (EP) .................................... 11186094

(51) Int. Cl.
*C01B 3/24* (2006.01)
*C10J 3/50* (2006.01)
*F23D 11/10* (2006.01)

(52) U.S. Cl.
CPC .. *C10J 3/50* (2013.01); *C10J 3/506* (2013.01); *F23D 11/106* (2013.01); *C10J 2300/0989* (2013.01); *F23D 2214/00* (2013.01); *F23D 2900/00016* (2013.01)

(58) Field of Classification Search
USPC ........................................................ 423/650
See application file for complete search history.

(56) References Cited

U.S. PATENT DOCUMENTS

| | | | |
|---|---|---|---|
| 2,281,562 A | 5/1942 | Ditto et al. | |
| 8,419,420 B2* | 4/2013 | Niehoff | ............................. 431/8 |
| 8,741,180 B2* | 6/2014 | Mueller-Hagedorn et al. | ............................. 252/373 |
| 2006/0107595 A1* | 5/2006 | Davison | ..................... C10J 3/22 48/127.5 |
| 2007/0163176 A1* | 7/2007 | Ruger | ..................... C10J 3/487 48/210 |

FOREIGN PATENT DOCUMENTS

| | | |
|---|---|---|
| CN | 86103455 | 11/1986 |
| CN | 1182778 A | 5/1998 |
| CN | 1944590 | 4/2007 |
| CN | 101024489 | 8/2007 |
| CN | 102191087 | 9/2011 |

(Continued)

OTHER PUBLICATIONS
Translation of WO 2011/032663, Mar. 2011.*
(Continued)

*Primary Examiner* — Melvin C Mayes
*Assistant Examiner* — Kenneth Vaden

(57) ABSTRACT

Gasification reactor and process for the production of synthesis gas by partial combustion of a carbonaceous feed. The reactor comprises a reactor chamber with one or more burners and at least one oil lance extending into the reactor chamber. The oil lances can for instance be located at a level 1.5 meters or less below or above the burners.

11 Claims, 2 Drawing Sheets

(56) References Cited

FOREIGN PATENT DOCUMENTS

| | | |
|---|---|---|
| DE | 102009041854 | 3/2011 |
| EP | 0108427 | 8/1983 |
| EP | 0108425 | 5/1984 |
| EP | 0130630 | 1/1985 |
| EP | 0509581 | 10/1992 |
| EP | 1148295 | 1/2000 |
| GB | 943223 | 12/1963 |
| WO | 2009081282 | 7/2009 |
| WO | 2011/085744 * | 7/2011 |

OTHER PUBLICATIONS

Translation of CN 1182778, May 27, 1998.*

* cited by examiner

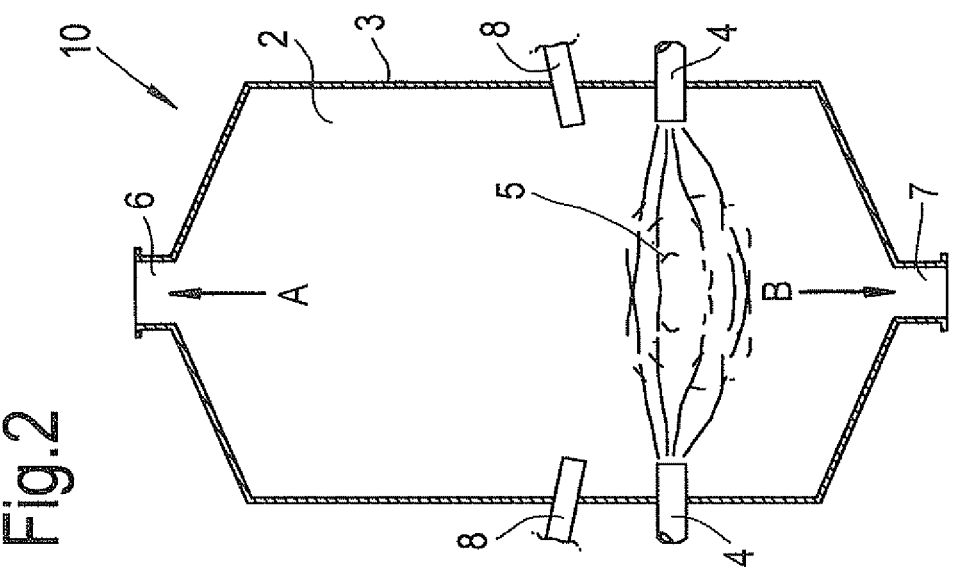
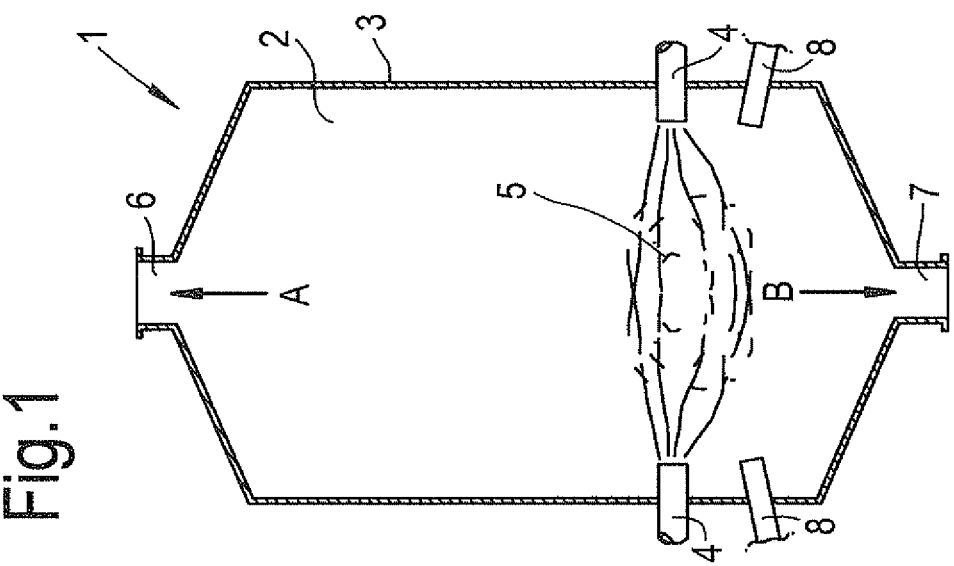

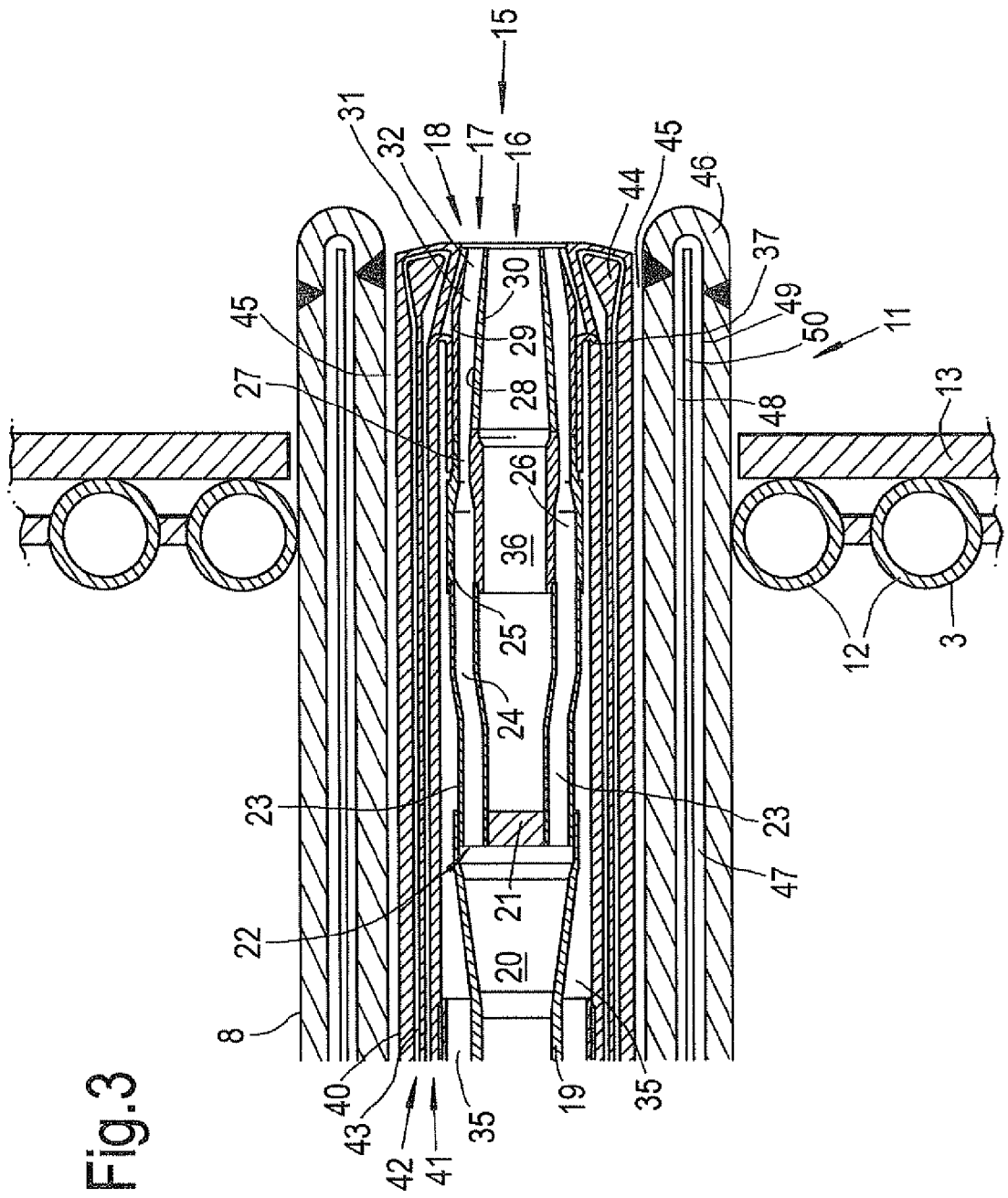

GASIFICATION REACTOR

PRIORITY CLAIM

The present application is the National Stage (§371) of International Application No. PCT/EP2012/070548, filed 17 Oct. 2012, which claims priority from European Patent Application No. 11186094.6, filed Oct. 21, 2011, the disclosures of which are hereby incorporated by reference.

The invention relates to a gasification reactor and a process for the production of synthesis gas by partial combustion of a carbonaceous feed. The carbonaceous feed can for instance be pulverized coal, biomass, oil, bio-oil, hydrocarbon gas or any other type of carbonaceous feed. The produced synthesis gas is a gas comprising carbon monoxide and hydrogen gas and is typically used as a fuel gas or as a feedstock for chemical processes.

Under certain circumstances, it may be desirable to make use of more than one type of carbonaceous feed. It may for instance be desirable with reactors for pulverized coal to replace part of the coal by biomass. In that case the thermal efficiency of the reactor may decrease due to the lower heating value of biomass.

It is an object of the invention to improve the production rate of such gasification reactors and processes. It is a further object to allow co-processing of different types of carbonaceous feed without decreasing the production efficiency.

This is achieved with a gasification reactor comprising a reactor chamber with one or more burners and at least one oil lance for the supply of liquid oil extending into the reactor chamber. Surprisingly it has been found that co-feeding oil via separate oil lances to the combustion of the carbonaceous feed substantially improves productivity of the reactor, even when part of the carbonaceous feed (e.g., pulverized coal) was replaced by biomass.

In a refinement, the one or more oil lances can be positioned at the same level or a different level than the burners. The lances can for example be positioned at a distance above the burners, but particularly good results are achieved when the oil lances are positioned at a distance below the burners, e.g., at a distance of about 1.5 meters or less below the burners. Optionally, the reactor may comprise lances above as well as below the level of the burners.

In a further refinement the oil lances can be directed to a combustion area of a burner.

The gasification reactor is particularly useful for the partial combustion of pulverized coal. To this end at least part of the burners can be connected to a supply line for pulverized coal and a supply line for oxygen.

To protect the oil lances from thermal loads and damage, the part of the oil lance extending into the reactor chamber can be provided with a cooling sleeve. The cooling sleeve may surround the lance tip and be connected with a supply and a discharge for a coolant. The coolant will typically be water.

The oil lance may for instance comprise coaxial channels for the separate supply of oil and steam. The oil may comprise bio-oil, oil from other sources, such as after-used lubricant or heavy residue from a refinery and the like or a mixture thereof. The term "bio-oil" includes liquid hydrocarbons from plants, animals (such as resin/vegetable oil, fat, or waste cooking-oil, etc.) and comprises oil from animal fat or resin from trees, hogwash oil and the like. Preferably, the oil is supplied as a single phase liquid.

In a further refinement, the oil lance can comprise an atomizing nozzle. Such a nozzle can for instance comprise a coaxial arrangement of an oil supply channel flanked by at least one adjacent steam supply channel. Very good atomization is obtained with oil lances having a nozzle with steam supply channels at both sides of the oil supply channel. This can be achieved by a nozzle with an annular oil supply channel coaxially arranged between an adjacent central steam supply channel and an adjacent annular steam supply channel. This way, the steam flow at both sides of the oil flow will break up and atomize the oil flow. Atomization can be further improved if the steam flow velocity is about 10-18 times the oil flow velocity. The oil flow velocity is typically about 6-12 m/s, although other velocities can also be used if so desired.

Additional oxygen for the combustion of the oil can be supplied via the oil lance, e.g. via steam channels in the oil lance (supplied as steam/oxygen mixture), and/or via the oxygen channels of the other burners.

The invention also pertains to a process for the production of synthetic gas by partial combustion of a carbonaceous feed in a gasification reactor, wherein a mixture of oxygen and the carbonaceous feed is fed to the gasification reactor via one or more burners, while oil is atomized into the reactor via one or more lances.

The oil can be atomized, e.g., by a concurrent flow of steam, at the same level as the burners or at a different level, e.g., at a distance below or above the one or more burners.

Good results are obtained if the carbonaceous feed comprises pulverized coal and the mass feed ratio of oil to pulverized coal is within the range of about 1/5-2/5. Due to the supply of oil via the oil lances, the pulverized coal can partly be replaced by biomass up to about 30% by weight of the coal without decreasing the reactor efficiency.

If the additional oxygen required for the combustion of the oil is supplied via the burners, the feed ratio of oxygen to pulverized coal can for example be within the range of 1/1-1,3/1, depending on the coal properties.

The oil/steam feed ratio can for instance be within the range of 3/1 to 5/1, depending on the oil properties.

During combustion, the temperature in the reactor chamber will typically be in the range of 1500-1700° C. The pressure in the reactor chamber will generally be in the range of 25-60 barg.

An exemplary embodiment of the invention will now be described by reference to the accompanying drawings, in which:

FIG. 1: shows schematically in cross section an embodiment of a gasification reactor;

FIG. 2: shows schematically in cross section an alternative embodiment of a gasification reactor;

FIG. 3: shows in cross section an oil lance of the gasification reactor of FIG. 1 or 2.

FIG. 1 shows a gasification reactor 1 comprising a reactor chamber 2 with a reactor chamber wall 3. The wall 3 may for example be formed by parallel (vertical or helically wound) coolant lines for transporting water or another coolant to prevent the wall 3 from overheating. A number of burners 4 extend through the wall 3 into the reactor chamber 2. Oxygen and pulverized coal and/or biomass, respectively, are blasted into the reactor chamber 3 via different channels of burners 4 and combusted in a combustion area 5 to produce synthesis gas and slag. Synthesis gas flows upwardly as indicated by arrow A in the drawing to be discharged via a discharge 6 for cooling and further processing. Slag falls downward as indicated by arrow B in the drawing and is discharged via a slag discharge 7.

At a distance below the burners 4 (e.g., within 1.5 meter) a number of oil lances 8 extend into the reactor chamber 2. The oil lances 8 are directed towards the combustion area 5. Oil atomized by steam is blown into the combustion area 5 where the oil is partially combusted by oxygen from the burners 4.

FIG. 2 shows an alternative embodiment of a gasification reactor. Same reference numbers are used for parts which are the same in the embodiment of FIG. 1. The gasification reactor 10 in FIG. 2 is identical to the reactor of FIG. 1 with the difference that the oil lances 8 are at a higher level than the burners 4 (e.g., within 1.5 meter) and point downwards towards the combustion area 5.

FIG. 3 shows a tip of an oil lance 8 in more detail. The oil lance 8 is positioned in an opening 11 in the wall 3 of the reactor chamber 2. As set out above the wall 3 is formed of spirally would coolant lines 12 interconnected to form a gastight wall structure. At the inside of the reactor chamber 2 the wall 3 is covered with a refractory lining 13 or by molten slag.

At its outer end the oil lance 8 comprises a nozzle 15 with a coaxial arrangement of a central steam channel 16, an annular oil channel 17 surrounded by an annular second steam channel 18. At a distance before the nozzle 15 the oil channel is the central channel with a cylindrical section 19 and a downstream widening conical section 20. The downstream end of the conical section 20 is capped with a circular disc 21 with a circular array of openings 22. Pipe lines 23 of equal length are connected to the openings 22. About halfway between the cylindrical section 19 and the nozzle 15, the pipe lines 23 are bent to form a diverging section 24 ending with a circular array of a larger radius at the downstream pipe line ends where these ends are connected to a ring channel 25. The ring channel 25 comprises a first section 26 narrowing down in downstream direction, a second section 27 of constant diameter, a third section 28 with an outer wall 29 of a constant diameter and a convergent inner wall 30, and a fourth section 31 where the outer wall 32 is parallel to the convergent inner wall 30.

At a distance upstream of the reactor wall 3, the central oil channel 19, 20 is surrounded by an annular steam channel section 35. From this section 35 steam can flow via the space between the pipe lines 23 to a central channel 36 surrounded by the annular oil channel section 25 to the steam channel opening 16. Steam also flows via an annular split 37 surrounding the annular oil section 25 towards annular steam channel opening 18.

Oil from the central oil channel sections 19, 20 is distributed via the pipe lines 23 into the ring channel 25, where it is accelerated in the narrowing section 26. When leaving the nozzle of the oil lance 8 the oil flows between the steam flow from the central channel 36 and the steam flow from the annular split 37. The flow velocity of the oil flow is substantially lower than the flow velocity of the steam flows. A suitable combination is for instance an oil flow velocity of about 8 m/s combined with a steam flow velocity of about 80 m/s. The faster steam flow will break up and atomize the oil flow.

The oil lance 8 comprises an outer wall 40 formed as a cooling water barrel with two coaxial cylindrical hollow spaces 41 and 42 divided by a cylindrical partition 43. The hollow spaces 41, 42 join each other at an enlarged downstream end 44. Cooling water will flow to the downstream end 44 via the inner hollow space 41. After passing the enlarged end 44 the cooling water flows back via the outer cylindrical space 42.

The oil lance 8 is surrounded by an annular gap 45 which is in turn surrounded by a cooling sleeve 46. During installation this gap 45 can be filled with thermal resistant materials, such as Nextel Cord®, to avoid leakage of synthesis gas during operation of the reactor. The cooling sleeve 46 is a double walled cylinder with a cylindrical inner space 47 enclosed within the double wall of the cooling sleeve 46. The inner space is divided into two coaxial cylindrical spaces 48, 49 by a cylindrical partition 50. At the downstream end of the cylindrical partition 50 the two cylindrical spaces 48, 49 are in open connection with each other. Cooling water will flow downstream within the inner cylindrical space 48 to turn around the end of the cylindrical partition 50 to flow back in the opposite direction.

To protect the oil lance 8 from slag dripping down from the wall 3 of the reactor chamber 2, the oil lance 8 is retracted over a short distance within the cooling sleeve 46.

That which is claimed is:

1. A process for the production of synthetic gas by partial combustion of a carbonaceous feed in a gasification reactor at a pressure of between 25 to 60 barg, the method comprising the steps of:
feeding a mixture of oxygen and the carbonaceous feed, the carbonaceous feed comprising pulverized coal, to the gasification reactor via one or more burners, while oil is atomized into the reactor via one or more oil lances, each comprising an atomizing nozzle comprising a coaxial arrangement of an oil channel and at least one adjacent steam channel;
replacing up to 30% by weight of the pulverized coal of the carbonaceous feed with biomass having a lower heating value and compensating for the lower heating value of the biomass by co-feeding the oil via the one or more oil lances without decreasing the thermal efficiency of the reactor.

2. The process according to claim 1 wherein the oil is atomized at a distance below the one or more burners.

3. The process according to claim 2 wherein the distance between the level of the one or more burners and the level of the oil lances is 1.5 meters or less.

4. The process according to claim 1 wherein the carbonaceous feed comprises a mixture of pulverized coal and biomass, wherein the biomass is present in an amount of up to 30% by weight of the pulverized coal.

5. The process according to claim 1 wherein the carbonaceous feed comprises pulverized coal and biomass and the mass feed ratio of oil to the total mass of pulverized coal and biomass is within the range of 1/5-2/5.

6. The process according to claim 1 wherein the oil is supplied as a single phase liquid.

7. The process according to claim 1 wherein at least part of the one or more oil lances are positioned at a different level than the burners.

8. The process according to claim 1 wherein each oil lance is directed to a combustion area of a burner.

9. The process according to claim 1 wherein one or more of the burners are connected to a supply line for pulverized coal and a supply line for oxygen.

10. The process according to claim 1 wherein the one or more oil lances comprise coaxial channels for the separate supply of oil and steam.

11. The process according to claim 1 wherein the oil velocity is between 6 and 12 m/s and the steam velocity is 10 to 18 times the oil velocity.

* * * * *